July 16, 1974  J. J. FIORELLA  3,824,322

FLAVORED STIRRER FOR ALCOHOLIC BEVERAGES

Filed Dec. 20, 1971

United States Patent Office 3,824,322
Patented July 16, 1974

3,824,322
FLAVORED STIRRER FOR ALCOHOLIC BEVERAGES
John J. Fiorella, 181 Richmond Ave.,
Buffalo, N.Y. 14222
Filed Dec. 20, 1971, Ser. No. 209,737
Int. Cl. C12g 3/06
U.S. Cl. 426—134                            9 Claims

ABSTRACT OF THE DISCLOSURE

A flavored stirring implement for alcoholic beverages contains flavoring means held to a stirring portion of the implement and communicable with the alcoholic beverage through or at an exterior surface of the implement so that when the stirrer is moved through the alcoholic beverage flavoring is dispensed to and dissolved in the beverage. In a preferred form of the invention the flavoring is held to a plastic tubular stirrer by being deposited in perforations in the middle third of the stirrer in the hollow of the tube, with crimps in the tube also serving to hold the flavoring in place and with additional perforations being provided through the tube to circulate beverage into contact with the flavoring during stirring. Also disclosed are methods for the manufacture of such stirrers.

---

Alcoholic beverages, such as cocktails and highballs have been flavored by additions of flavoring agents in solid or liquid form. Dispensers have been designed to accurately measure out small amounts of particular flavoring agents, such as bitters, only drops of which are used in certain drinks. Fresh fruits, e.g., citrus fruits such as lemons, limes and cherries, olives, and onions, are conventionally added to alcoholic beverages for flavoring and visual effects and their juices have been used. Twists or peels of citrus fruits have also been employed. However, in most such cases the materials used are perishable or should be kept under refrigeration, once a container thereof is opened. Thus, it is seen that there is a distinct advantage in being able to flavor alcoholic beverages with an accurately and conveniently dispensable flavoring agent which does not require special handling or treatment.

Non-alcoholic beverages, such as milk have been flavored and one means of accomplishing this has been to include within a straw a deposit of flavoring agent, so that when the straw is employed to deliver milk to the drinker the milk becomes flavored. Such straws, containing internally located flavors, placed at an end of the straw, can also be moved through a glass of milk to dissolve the flavoring agent therein. Thus, it is known to flavor non-alcoholic beverages with specific flavoring agents located in the interiors of drinking straws.

Although the flavoring of alcoholic beverages is known and flavors have been incorporated in drinking straws for changing the tastes of non-alcoholic beverages, before the present invention no means had been provided for flavoring cocktails and highballs with flavors such as onion, lemon or bitters extracts by means of a stirring rod or tube, which also served to aid in mixing the drink. Furthermore, no structure of the present flavored stirrers for alcoholic beverages has been desicribed which would maintain the flavoring agent in convenient position in or on such a stirrer and protect it before use, while allowing easy measured dispensing thereof by the consumer. This has now been accomplished by the present invention.

In accordance with this invention a flavored stirrer for alcoholic beverages, useful for stirring such beverages and imparting a desired flavor to them easily, comprises a stirring implement having stirring and handle portions, and flavoring means for aqueous alcoholic beverages which contain from 10 to 50% of alcohol, and soluble in them, held to a stirring portion of the implement, with at least a part of the flavoring means communicable with an alcoholic beverage in which it is placed, through or at an exterior surface of said stirring portion and readily contactable with said alcoholic beverage being stirred, so that on moving the flavored stirrer through the alcoholic beverage with a stirring motion, the flavoring is dissolved in the beverage. In preferred forms of the invention, the stirring implement is a plastic cylindrical tube containing perforations in about the middle third thereof, the flavoring means is located inside the tube and also fills some of the perforations, which are structured so as to hold the flavoring means in place therein, the tube is crimped about the flavoring means to assist in holding it in place and additional perforations are provided near those filled with flavoring agent, so as to assist circulation of the alcoholic beverage past the flavor, to dissolve it controllably.

The invention and its advantages will be apparent from the present description, taken in conjunction with the accompanying drawing in which.

Figure 1:
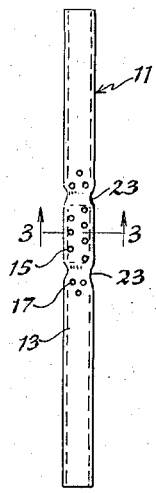
FIG. 1 is an elevational view of a flavored cylindrical stirrer of a construction in acordance with the present invention.
Figure 2:
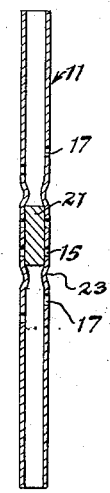
FIG. 2 is a central sectional elevation of the stirrer of FIG. 1, taken along plane 2—2 of FIG. 3.
Figure 3:
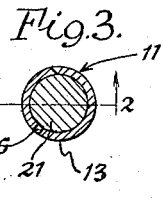
FIG. 3 is a horizontal sectional view of the stirrer of FIG. 1, taken along plane 3—3 thereof.
Figure 4:
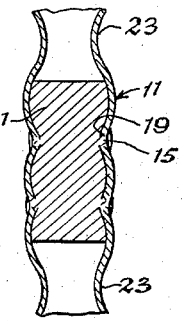
FIG. 4 is an enlarged partial central sectional view of a central portion of the stirrer of FIG. 2.

In FIG. 1 numeral 11 represents a flavored tubular stirrer for alcoholic beverages, which may be made of paper or synthetic organic plastic or other suitable material. The exterior surface 13 of the preferred polypropylene or polyethylene cylinder has perforations 15 and 17 therein, located in the central third of the length of the stirrer. Perforations 17 may be near openings in the wall or exterior surface 13 of the tube, sharp edged and without wall material being forced inwardly but, as is shown in FIG. 4, at 19, such portions 15 of the pre-perforation surface of the cylinder or tube are preferably pushed inwardly so as to provide projections to assist in holding flavoring means 21 in place therein. Of course, the flavoring means also fills perforations 15 and does so even when they are sharp edged orifices without extensions into the interior of the tube of the type shown in FIG. 4. This also assists in holding the flavoring means 21 in place in the tubular stirrer. The cylinder is also crimped at 23, in positions above and below the flavoring means 21, also assist in holding it in place. Additional perforations 17, which are clear of flavoring means, furnish openings for flow of the alcoholic beverage to assist in dissolving any of the flavor in the interior of the tube. Of course, such flavor which fills perforations 15 is also in contact with the alcoholic beverage and can dissolve readily, after which portions of the flavor adjacent to such openings will dissolve, forming channels in the favoring agent which will further assist solution, through both types of perforations 15 and 17.

Figure 5:
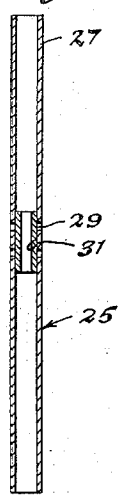
FIG. 5 is a central vertical section of another tubular stirrer of this invention.

In FIG. 5 there is illustrated a modification of the prefered structure of FIGS. 1–4, showing stirrer 25 having an external surface or wall 27, perforations 29 through the wall, which perforations may be clean edged or preferably, which extend interiorly into the tube, due to the piercing method used for producing the openings (which may be effected by means of heated piercing means which sufficiently deform the plastic or other materials so as to prevent closure of the perforations), and flavoring 31 inside the hollow stirrer. It will be seen that the flavoring means does not fill the hollow of the stirrer but is applied around the interior surface thereof in the form of a cylindrical section. In this embodiment, crimping is omitted, as are additional perforations not contiguous with the flavoring agent. The stirrer produced is more regular than that of FIGS. 1–4 and hence, may be considered slightly more attractive but functionally, it does not hold the flavoring means as well.

It will be observed with the stirrers of FIGS. 1–5 that they may be held at either end, which may be considered to constitute the handle portion thereof, with the other end and the central third of the stirrer being the stirring portion from which flavoring means is dispensed to an alcoholic beverage. The flavoring agent is generally designed to be readily soluble in a 10 to 50% aqueous ethanol (20 to 100 proof alcohol) but if desired, the solubility rate may be adjustable by variations in the formulation of the flavoring agent and carriers for the active flavoring essences thereof.

Figure 6:
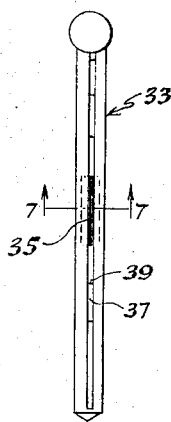
FIG. 6 is an elevational view of a solid flavored stirrer, having flavoring ingredient on an undercut external surface thereof.
Figures 7, 8:
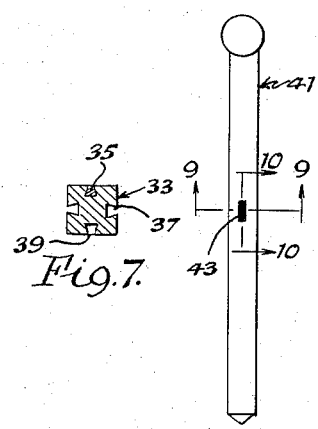
FIG. 7 is a horizontal sectional view along plane 7—7 of FIG. 6.
FIG. 8 is another elevation of a solid stirring rod having flavoring means embedded in a surface thereof.

In FIG. 6 another form of stirring implement 33 is illustrated, which is a solid rod of substantially square cross-section, having flavoring means 35 on an exterior surface thereof. Channels or grooves 37 in the rod are undercut, as illustrated, so as better to hold the flavoring means therein. A plurality of such grooves is provided with periodic interruptions or transverse walls 39 so that desired charges of flavoring means may be used. In FIGS. 6 and 7, only one short length of flavoring is shown but if desired, additional amounts thereof may be employed.

Figure 9:
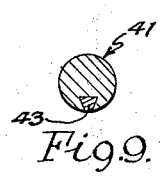
FIG. 9 is a horizontal sectional view along plane 9—9 of FIG. 8.
Figure 10:
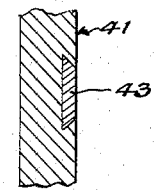
FIG. 10 is a partial vertical section of the rod of FIG. 8 along plane 10—10 thereof.

In FIGS. 8–10 a variation of the solid stirrer of FIGS. 6 and 7 is illustrated, said rod 41 containing flavoring agent 43 in a donble-undercut deposit.

As has been mentioned, the preferred materials of construction of the present stirrers are the synthetic organic plastics. These may be molded or extruded in the shapes illustrated, with perforations, crimps, projections, grooves, slots, and undercuts, or may be produced in tubular or rod form and the configurations illustrated may be subsequently made by piercing, perforating, cutting, routing, etc. Also modifications of the illustrated structures can be employed. Although paper may be used, when employed it is preferably treated with plastic or other material to improve its wet strength. Almost all non-toxic thermoplastic or thermosetting synthetic organic polymers are useful, but, as a practical matter, with respect to ease of manufacture and economic considerations, the most important of these are polypropylene and polyethylene, both of which can be made with and processed by high speed extrusion, perforating and filling equipment. Such thermoplastics are particularly suitable for crimping with the aid of heat and for perforating in such a manner that the inwardly directed portions of the walls form prongs or anchors for the flavoring agent. Also, such plastics may be made transparent or translucent and the user of the stirrer is able to detect the extent to which flavoring material had been consumed. This may also be determined by including in the flavoring composition an amount of coloring agent which indicates the extent of flavoring by the depth of desired color given to the beverage.

The flavoring means employed will frequently be a natural extract, often being an alcoholic extract or a material which is readily alcohol soluble. Alternatively or in supplement of the natural extract, synthetic flavors may be utilized. Such materials will either be normally solid or will be capable of being converted to solid form by being deposited on or sorbed by a carrier. Such a carrier may comprise a suitable sugar, sorbitol, mannitol, corn syrup solids, milk solids, monoglycerides or diglycerides, gums, natural or synthetic, e.g., gum tragacanth, locust bean gum, inorganic salts or insoluble mineral powders, e.g., talcs, or resins. In some cases, small sponges containing liquid flavoring agent will be used as a flavoring means. Of course, various plasticizers, and solvents, such as glycerol, water and ethanol may be used, either in the product or during manufacture thereof, to facilitate filling of the tube portion or grooves in the rods. Most preferably, the flavoring agents employed will be natural fruit flavors, such as lemon and lime flavors, sometimes with dried fruit peels or other fruit essences included therein.

The manufacture of the present product is simple and may be readily undertaken with high speed equipment which automatically inserts the flavoring means or positions it. With the aid of heat or solvents the flavoring is usually initially made sufficiently plastic to be readily added either through the perforations at the exterior of the tube, through an end thereof with a hypodermic needle-like filling means or by spreading material into an undercut or other suitable external groove or indentation in a rod or tube. With quick cooling or evaporation thereafter, the normally solid flavoring agent, added to the tube or rod as a fluid, may be solidified, quickly packed and sent to storage and shipped. In manufacturing products of the type illustrated in FIGS. 1–4, an adapter may be utilized which grasps the tube so that only a particular desired weight of flavoring means may be added through perforations 15 and will not extend to and extrude out through perforations 17. With respect to the filling of the flavored stirrer of FIG. 5, less flavoring is added and it is distributed about the interior wall of the tube by centrifugal forces resulting from rotation of the tube, during which time it is cooled or has solvent evaporated therefrom to solidify it.

The stirring rods of FIGS. 6–10 may be filled in an analogous manner, with measured charges of flavoring composition preferably being added to such rods by insertion of a flavoring composition, in flowable form, into one or more cavities thereof. The machine for applying such composition includes a filling means which is flexible and adapted to seal off the cavity from other grooves or communicating sections of the rod so that there will be no overfill. Also, after filling of the undercut cavity the flavoring composition may be pressed into place to firm it and to prevent any of the composition from extending beyond the exteral walls of the cavity. This lessens the chance of the flavoring being accidentally removed by contact with other stirrers during shipping, or with a glass, ice cubes or other materials during use.

It will be noted that in the preferred embodiments of the invention the design of the present stirrers, including those of FIGS. 1–5, is such that the flavoring does not project beyond the external wall of the stirrer to any significant extent and thereby, the integrity of the product is assured, with each stirrer having its desired amount of flavoring material present when it is ready for use. The prongs, indentations and undercuttings illustrated, and other means for holding the flavoring composition to the stirrer also assure that with suitable compositions there will not be any loss of flavoring materials before intended uses. During such uses, even with some of the flavoring composition dissolving, the tendency is for the walls of the various apertures to hold onto the flavoring and retain it in position on the stirrer for suitable lengths of time, so that the flavoring is not released to the beverage in a lump or as separate grains. Thus, when the desired extent of flavoring has been obtained, the mixing tube or rod may be removed, whereas if the flavoring was released too quickly, there would be little control of the amount of the flavor being imparted to the beverage because the composition in the beverage would continue to dissolve and impart additional flavor thereto.

The various advantages of the present invention are evident in large part from the drawings and the foregoing description. Additionally, it will be seen that the stirrer protects the flavoring during storage before use and if so desired, the stirrers may be additionally protected by wrapping without the flavoring interfering with the wrapping operation. The substantially internal location of the flavoring composition protects it from being released by shocks transmitted to the stirrers during shipment and in use and also helps to protect it from being oxidized by the air or being subjected to external flavors and odors. Similarly, the extent of evaporation of volatile materials is diminished. Yet, with the tubular stirrers, delightful fragrances may be released from the stirrer through an end thereof when it is being used to stir and flavor beverages. By location of the flavoring means at a mid-point in the length of the stirrer, or in the central third thereof the stirrers may be employed using either end as a handle and obtaining the desired flavoring effects. Such use puts the flavoring in the top portion of the beverage but additionally allows it to be distributed throughout. When it is desired to halt the flavoring, the stirrer may be withdrawn but it is still useful for stirring the beverage with the lower third thereof without increasing the amount of flavoring. The present stirrers are economical to manufacture and easy to employ. They give reproducible flavorings to alcoholic beverages, which are not obtainable from fresh fruits or vegetables and which are less conveniently obtained from extracts or separate flavoring materials to be added to such a beverage. Of course, the flavors do not have to be touched by human hands during manufacture and use and therefore, are also more sanitary in this respect than fresh fruits, etc.

The various stirrers employed may be utilized to convey single flavoring materials to beverages or a plurality of such flavors may be blended in the flavoring composition in a single stirrer. The stirrers may be identified by color or design coding, names printed thereon or by representations of the various fruits, vegetables and other flavoring agents contained in the stirrers, such representations possibly being pictures of the flavoring fruits, etc., or such shapes molded into the stirrers or joined onto them. If desired, the flavoring compoistions may be embedded in such molded items in a similar manner as has been described with respect to the stirrer implements themselves.

Various modifications of the illustrated structures may be made within the invention. The cross-sections of the stirrers can be modified so as to be of different geometric shapes, e.g., hexagonal, fluted, triangular, star-shaped, etc. The tubular stirrers can have plugs inserted, molded or pressed in to block off the flavoring composition from the ends of the stirrers, if desired. The flavoring may be covered over with sealing means which do not cover the entire stirrer, e.g., pressure sensitive tapes, to further protect them. Dehydrated fruit and vegetable peels and other parts may be included in the flavoring, which may be released therefrom to expand to form a visible and identifiable part in the alcoholic beverage. Encapsulated flavorings may be employed so as to provide a continuing flavoring effect, due to the dissolving of different thicknesses of protective coatings over the flavor. F. D. and C. colors may be utilized to color the flavoring and the beverage being stirred. Preservatives, antioxidants, acids and buffers may be present to regulate the pH of the flavoring and of the beverage and to prevent the flavoring from being degraded during manufacture and storage. Vegetable gums, such as alginates, carageenan and carob bean gums, may be employed to hold the flavoring tightly to the stirrer and to slow solubility thereof. Some of these may be gelled after being added to the tubes or rods, to hold the flavor in place. For example, alginates may be converted to the insoluble calcium salts to solidify the flavor components to the stirrers. Solubilizing agents, such as glycerol, emulsifiers, such as glyceryl lactostearate and readily soluble compounds, such as sugars, citric acid and, in some compositions, salt, e.g., sodium chloride, may be present to aid in solubilizing the flavoring agents, in addition to contributing flavors of their own. Additional changes in the stirrers will be apparent to one of skill in the art from this specification.

The following example illustrates the invention, unless otherwise indicated, all parts are by weight and all temperatures are in degrees C.

EXAMPLE

A hollow polypropylene tube, 3.5 mm. in diameter and 14 cm. long has a plurality of perforations of the types illustrated in FIGS. 1–4 made therein by piercing with a hot pointed rod. There are forty perforations made, all of which are in the central 40 mm. of the tube, with ten of them above and ten below a central section thereof (the central 20 mm.) in which flavoring is to be deposited. Diameters of the holes made are about 0.5 to 1 mm.

A flavoring composition is made by combining lemon juice, citric acid, corn syrup solids, natural lemon flavor, monosodium phosphate, glyceryl lactostearate, vegetable gum (carageenan), dehydrated lemon peel and butyl hydroxyanisole. The proportions of the flavoring agents employed are controlled to obtain the most desirable lemon flavor, while maintaining the product in solidifiable form. The final product includes, on a solids basis, about 80 to 90% of solids, which are mostly citric acid, corn syrup solids and vegetable gum (which may include pectin). In some cases such a product may be applied as a foam (to speed solution).

Of the products the most useful contain about 0.5 to 10% of citric acid, 10 to 70% of corn syrup solids and 0.1 to 10% of the vegetable gum. Lemon solids, natural lemon flavor, monosodium phosphate, glyceryl lactostearate and butyl hydroxyanisole are minor components, usually being present in the range of from 0.01 to 5%, preferably from 0.1 to 1%. The dehydrated lemon peel may comprise from 1 to 10% of the product or may be omitted from these products. The balance of the composition is usually water but other liquids may be used as solvents or plasticizers.

As applied, the moisture content of the flavoring composition is in the range of 20 to 70%, preferably from 20 to 40%. The product solidifies after application due to the action of the vegetable gum, which keeps it from becoming sticky. Also, during storage, some of the moisture evaporates and although the product shrinks slightly, this is not detrimental.

Application of the flavoring composition is made by masking the upper and lower ten holes and adding a measured weight, about 0.02 to 0.5 gram, of moist flavoring composition to the volume in contact with the middle twenty perforations, and allowing it to solidify. The perforations also facilitate drying of the material and hardening of the surface thereof. Instead of utilizing water as a solvent, more volatile solvents, such as ethanol, may be employed or the materials may be heated to make them more readily flowable, followed by cooling after charging of the stirrers, to solidify the flavoring composition.

In modifications of the procedure followed, the rods having undercut recesses are filled in a similar manner. Changes are made in the formulation to give the drinks lime, orange, onion, cherry, olive, pineapple or other suitable flavor, usually by a combination of natural and synthetic flavors. In some cases, the flavors are incorporated in sponges, porous synthetic organic plastics, are encapsulated or are employed to coat the surfaces of plastics and fill interstices therein, followed by application of such prepared flavoring materials to the stirrer in the usual manner or by cementing thereto.

When in use, the stirrers, color or name-identified to indicate the flavor contained, are packed or boxed as ordinary stirrers, wrapped or unwrapped, and are used to flavor the appropriate alcoholic beverage. At such time, it is only necessary to take either end of the stirrer, insert it into the glass of beverage and stir in a normal manner, checking the flavor and halting the stirring when desired. The use of the stirrer is simple and the flavors obtained are so satisfactory that in blind comparison tests most drinkers cannot detect any differences.

The invention has been described with respect to specific illustrations and examples thereof but it is clear to those of skill in the art that equivalents may be employed and substitutions may be made without departing from the spirit of the invention or going beyond its scope.

What is claimed is:

1. A flavoring stirrer for aqueous alcoholic beverages which contain from 10 to 50% of alcohol, useful for stirring such beverages and imparting a desired flavor to them, which comprises a stirring implement which is insoluble in such alcoholic beverages and is in the form of a rod or tube having stirring and handle portions, the handle portion of which is at an end thereof and contains no flavoring material, and the stirring portion of which has a plurality of external indentations, external hollows, or external depressions in, or perforations through, a side thereof, and flavoring means, soluble in such alcoholic beverages, which are held in such indentations, hollows, depressions, or perforations in the stirring portion of the stirring implement until intended use, with at least a part of the flavoring means being directly communicable and contactable upon such use with an alcoholic beverage in which the stirrer is placed, so that on moving the flavored stirrer through the alcoholic beverage with a stirring motion the flavoring is dissolved in the beverage.

2. A flavoring stirrer for alcoholic beverages, according to claim 1 wherein the stirring implement is a tube containing a plurality of perforations through the wall thereof and the soluble flavoring is located in such perforations and within the tube adjacent to such perforations in a unitary deposit so that portions thereof in the perforations anchor a portion in the tube and hold it firmly in place until intended use, an exterior wall of the tube contains additional unfilled perforations near those filled with flavoring means, which additional perforations extend from the exterior of the tube to the interior thereof and facilitate passage of alcoholic beverage through the tube to aid in dissolving flavoring means when the flavored stirrer is utilized to stir an alcoholic beverage, the tube is of a synthetic organic plastic, the flavoring agent is a natural or synthetic food flavor on a normally solid carrier therefor and the perforations and the flavoring agent are located in the middle third of the stirrer.

3. A flavoring stirrer for alcoholic beverages, according to claim 1, wherein the stirring portion has a plurality of external indentations, hollows or depressions in a side thereof and the soluble flavoring means is held in such indentations, hollows or depressions in the stirring portion of the implement until intended use.

4. A flavoring stirrer according to claim 3 wherein the flavoring is in a plurality of external undercut channels or grooves.

5. A flavoring stirrer according to claim 4 wherein the grooves are located in the middle third of the stirrer.

6. A method of making a flavored stirrer for alcoholic beverages, useful for stirring such beverages and imparting a desired flavor to them, which comprises applying in liquid form to an exterior surface of a stirring portion of a stirring implement having stirring and handle portions a normally solid flavoring means comprising flavor and normally solid carrier, passing such normally solid flavoring means, in liquid form, through openings in the stirring portions of the stirring implement to the interior thereof and solidifying such flavoring means.

7. A method according to claim 6 wherein the stirring implement to which the flavoring means is applied is a perforated tube and a measured quantity of flavoring means is inserted into a portion of said tube through some of such perforations, to fill them and the hollow of the tube adjacent to them, without filling adjacent perforations through which the alcoholic beverage circulates during stirring.

8. A method of making a flavoring stirrer for alcoholic beverages, useful for stirring such beverages and imparting a desired flavor to them, which comprises applying to an exterior indentation, hollow, depression or groove of a stirring portion of a stirring implement having stirring and handle portions, in liquid form, a normally solid flavoring means comprising flavor and normally solid carrier, and solidifying such flavoring means in place on the stirrer.

9. A method of making a flavoring stirrer for alcoholic beverages, useful for stirring such beverages and imparting desired flavor to them, which comprises applying to a stirring implement having perforations in a wall thereof a measured quantity of flavoring means, in liquid form, which flavoring means comprises a normally solid flavoring means comprising flavor and normally solid carrier, and solidifying such flavoring means in place in the stirrer so that it is anchored to the perforations thereof.

References Cited
UNITED STATES PATENTS

| | | | |
|---|---|---|---|
| 3,154,418 | 10/1964 | Lovell et al. | 99—77.1 |
| 2,728,673 | 12/1955 | Mouton | 99—78 |
| 3,259,502 | 7/1966 | Ehrlich et al. | 99—78 |
| 3,102,465 | 9/1963 | Montesano | 99—77.1 |
| 2,846,313 | 8/1958 | Menkin et al. | 99—138 |
| 2,281,267 | 4/1942 | Chapman | 99—138 |
| 1,996,203 | 4/1935 | Hollingsworth | 99—138 |
| 3,620,759 | 11/1971 | Maddox | 99—78 |

JOSEPH SCOVRONEK, Primary Examiner

U.S. Cl. X.R.

426—192, 421